March 16, 1948. S. E. WOODBURY 2,437,986
CROSS-FEED MECHANISM
Filed Sept. 21, 1945 2 Sheets-Sheet 1

INVENTOR.
Stephen E. Woodbury.
BY
Kenway & Witter
Att'ys

Patented Mar. 16, 1948

2,437,986

UNITED STATES PATENT OFFICE 2,437,986

CROSS-FEED MECHANISM

Stephen E. Woodbury, Beverly, Mass., assignor to Reid Brothers Company, Inc., Beverly, Mass., a corporation of Massachusetts Application September 21, 1945, Serial No. 617,712

9 Claims. (Cl. 51—2)

This invention relates to a feed mechanism particularly adapted for use in or as a part of a machine tool. In order that the advantages of the invention may be fully appreciated it is shown as incorporated in a surface grinding machine, but it will be understood that the invention is by no means limited to a machine of this type.

This application is a continuation-in-part of my copending application for Grinding machines, Serial No. 500,078, which has now issued as Patent No. 2,390,978, dated December 11, 1945.

The principal object of the invention is to provide a feed mechanism for the purpose stated which not only permits feeding to be effected intermittently and automatically by power means, but which also permits movements in the feeding directions to be effected manually at any time without in any way interfering with the automatic action of the power means.

Further objects of the invention are to provide certain improved details and arrangements of parts which are effective in attaining the before-stated more general object.

Figure 1:
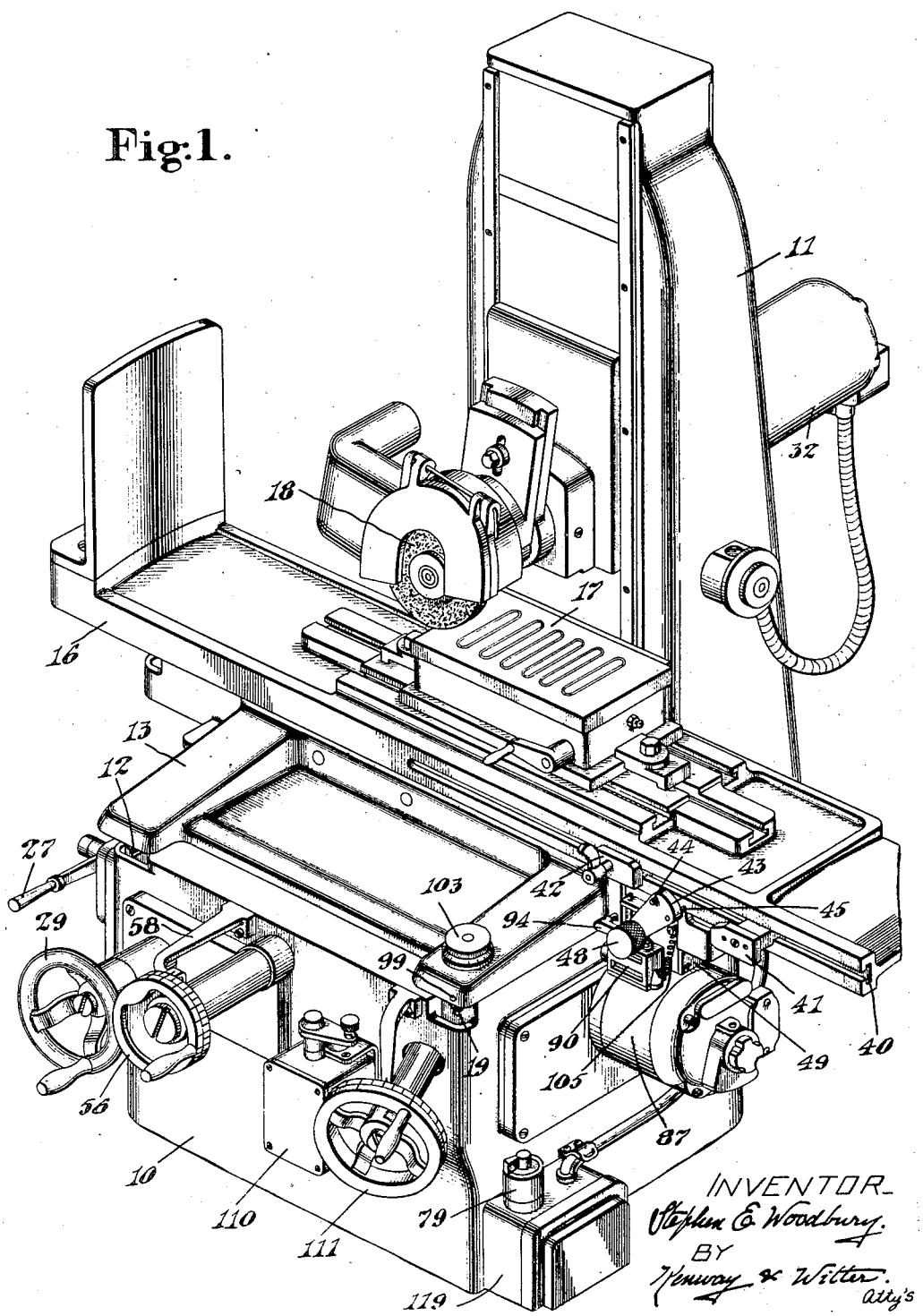
Figure 2:
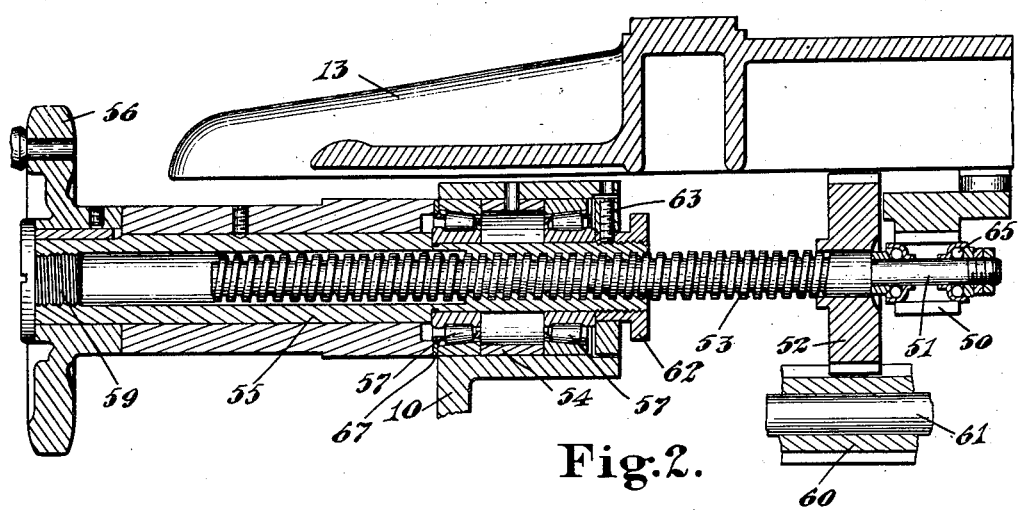
Figure 3:
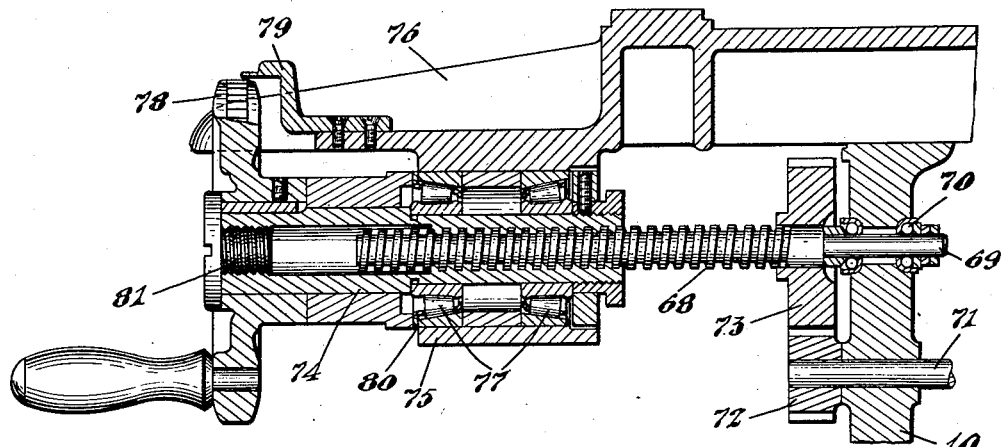

These and other features of the invention will be best understood and appreciated from the following description of certain embodiments thereof selected for purposes of illustration and shown in the accompanying drawings in which, Fig. 1 is a view in perspective showing the general organization of the machine, Fig. 2 is a longitudinal sectional view of portions of the cross feed mechanism, Fig. 3 is a view similar to Fig. 2, but showing an alternative embodiment of the invention.

The machine shown in the drawings for illustrating the invention is a grinding machine, and in such a machine the grinding wheel constitutes the cutting tool. Means are provided for effecting longitudinal reciprocating movements between the cutting tool and a work piece. While either the cutting tool or the work piece may be reciprocated, the illustrated machine is so constructed that the work piece is reciprocated on a suitable reciprocating table, the grinding wheel or cutting tool rotating about a fixed axis during movement of the work piece. Means are also provided for effecting relative transverse or cross feeding movements between the cutting tool and the work piece in timed relationship with the said longitudinal movements. While either the cutting tool or the work piece may be moved to effect cross feeding, the illustrated machine is so constructed that the table carrying the work piece is moved transversely, the grinding wheel or cutting tool rotating in fixed position. The general organization of the machine is not a part of the invention, except in combination with the novel cross feed mechanism which will be described.

The illustrated machine includes a box frame 10 from the rear side of which rises an upright column or post 11. A grinding wheel 18, together with its spindle and its individual driving motor 32, are mounted for vertical adjustment in a slide or carrier movably mounted on the post 11. The operative position of the grinding wheel is adjusted and controlled by a hand wheel 111, conveniently projecting from the front wall of the machine frame 10.

In the top of the machine frame 10 are provided spaced transverse ways 12 and 19, and in these ways rests the cross slide 13. The slide 13 is provided with longitudinal ways in its upper face toward the rear and in these ways an elongated work table 16 is supported for longitudinal movement or traverse. The table carries an adjustably mounted magnetic chuck 17 upon which a work piece to be ground by the wheel 18 can be clamped.

Longitudinal movement or traverse of the work table 16 back and forth on the cross slide 13 is normally effected by suitable means, which are not shown but which include an individual electric motor and power connections from the motor to the table; or longitudinal movement of the table can be effected by a hand wheel 29 which projects forwardly through the front wall of machine frame 10 near its left hand side. By means of a lever 27, the connections can be changed for power traverse or hand traverse as may be required.

In the power operation of the machine the length of work table movement and the points of reversal thereof are determined by a pair of dogs 41 and 42 adjustably mounted in an undercut slot 40 provided in the front edge of the table 16, as shown in Fig. 1. To this end a sector 43 is mounted to rock about the horizontal transverse axis of a shaft projecting forwardly from the casing of a reversing switch 49, the said switch being secured to one side of the cross slide 13. The aforesaid shaft projects forwardly and is provided with a knurled operating head 48 at its forward end. A pin 44 projects forwardly from one corner of the sector into the path of the dog 41 and a pin 45 projects rearwardly from the other corner of the sector into the path of the dog 42. When either dog 41 or 42 rocks the sector 43 the switch 49 is thrown and current in the longitudinal traverse motor is reversed and with it the direction of movement of the table. The same result may be obtained manually by turning the operating head 48 at any time when the sector 43 is clear of the dogs 41 and 42.

An individual cross feed motor 87 is shown as attached to the right hand wall of the machine frame 10. It is started and stopped by means of a switch 90 controlled by the operation of the sector 43. The mechanism and connections for controlling the motor 87 do not constitute a part of the present invention, and are fully disclosed in my aforesaid copending application of which this application is a continuation-in-part. For purposes of the present invention, it is sufficient to point out that the motor is started at or near the completion of travel of the table 16 in one direction or the other or both, and is continued for a predetermined interval and is then stopped. Each actuation of the feed motor 87 effects cross feeding of the slide 13 to a predetermined extent by means to be described, and the extent of each cross feeding movement can be adjusted by moving the switch 90 vertically by means of the manually operable disc 103. The direction of cross feeding can be determined by a manually operable reversing switch 110.

For effecting cross feeding, either by the motor 87 or manually, there is provided a rotatable screw and a rotatable nut engaging the screw, one of these elements being rotatably connected with the movable cross slide 13 and being movable axially therewith and the other of these elements being rotatably connected with the main frame 10 held against axial movement with respect thereto. Cross feeding can be effected by rotating the screw, or the nut, or both.

As shown in Fig. 2, it is the screw that is axially movable with the slide, this screw being shown at 53 and being a part of a shaft 51. At its inner end the shaft 51 is connected through ball thrust bearings 65 to a yoke 50 projecting downwardly from the lower face of the cross slide 13. This connection is the point of application of the feeding mechanism to the cross slide.

The cross feed motor 87 is connected to a shaft (not shown) carrying a worm (not shown) which meshes with an elongated pinion 60 mounted on a shaft 61 journaled within the enclosure of the frame 10. The elongated pinion 60 meshes with a gear 52 fast on the shaft 51 which carries the cross feed screw 53, and the length of the pinion 60 is such that it remains in mesh with the gear 52 throughout the entire range of movement of the slide 13 and of the said gear. Thus the shaft 51 and the screw 53 are rotated whenever the motor 87 is operated.

In threaded engagement with the screw 53 is an elongated nut 55 rotatably held in the front wall of the machine frame 10, preferably by means of anti-friction bearings, such as oppositely disposed roller thrust bearings 57, 57, which permit the nut to rotate but which prevent axial movement thereof. The outer races of the bearings 57, 57 are held in spaced relation by means of a sleeve 54. A hand wheel 56 is mounted on a forward extension of the nut 55 within convenient reach of the operator. The hand wheel 56 may be graduated as shown in Fig. 1, and an arm 58 is provided on the main frame having an indicating mark thereon adjacent the graduations on the hand wheel.

In cross feeding in either direction, movement of the slide 13 is effected by intermittent power rotation of the screw 53 relatively to the nut 55, or by manual rotation of the nut 55 relative to the screw 53 by means of the hand wheel 56. It will be seen that the manual movements of the slide effected by rotating the nut are supplemental to any power feeding movements effected by rotation of the screw. By rotating the nut by hand with the screw idle the slide may be moved in either direction to bring the work piece into proper relationship with the grinding wheel or cutting tool. When the screw is being intermittently operated by power to effect feeding, the nut can be rotated by hand to increase or decrease the amount of feeding without in any way interfering with or interrupting the regular intermittent rotation of the screw.

Means is provided for frictionally resisting the rotation of the nut 55. As shown, there is a friction washer 67 interposed between the nut and the outer race of the adjacent roller bearing 57. Preferably, the bearings 57, 57 are so arranged that longitudinal or endwise pressure can be applied to the inner races thereof by means of a threaded flanged bushing 62. The bushing is held in adjusted position by a set screw 63. The bushing may be so adjusted as to load the bearings to enable them to additionally resist turning of the nut 55. The resistance offered by the washer 67 and by the bearings 57, 57 is sufficient normally to prevent rotation of the nut 55 with the screw 53 by power transmitted from the motor 87, but it is not so great as to interfere with rotation of the nut by means of the hand wheel 56.

Upon power feeding of the cross slide in the forward direction, if the feeding is not otherwise stopped, the front end of the screw 53 will engage a stop screw 59 threaded into the forward extension on the nut 55 and the nut will then turn in the bearings 57, 57, thus stopping the feeding and preventing any damage to the machine. Under the condition last mentioned, the hand wheel 56 will turn idly with the nut 55. Upon power feeding of the cross slide in the rearward direction, if the feeding is not otherwise stopped, the cross slide 13 will reach its rearward limit of movement when the flange of the bushing 62 contacts with the hub of the pinion 52, and thereupon frictional engagement between the screw 53 and the nut 55 will be increased to such an extent that the nut will turn with the screw in the bearings 57, 57, thus permitting continued rotation of the screw without damage to the machine. In this case also the hand wheel 56 will turn idly with the nut 55.

Fig. 3 shows an alternative embodiment of the invention, and in this embodiment the rotatable screw is held against axial movement. The screw is shown at 68 and it is a part of a shaft 69. At its inner end the shaft 69 is connected through ball thrust bearings 70, 70 with a portion of the frame 10. The cross feed motor 87 is connected, ordinarily indirectly, to a shaft 71 journaled in the frame 10. The shaft 71 carries a pinion 72 which meshes with a gear 73 on the shaft 69. Thus the shaft 69 and the screw 68 are rotated whenever the motor 87 is operated.

In engagement with the screw 68 is an elongated nut 74 which is rotatably held in a bracket 75 depending from the bottom of a cross slide 76 which is similar in mounting and in function to the cross slide 13 but which differs therefrom as to certain details of construction. The nut 74 is preferably mounted in anti-friction bearings, such as oppositely disposed roller thrust bearings 77, 77. These bearings permit the nut to rotate but hold it in fixed relationship with the slide 76 so that it moves therewith. The bearings 77, 77 are or may be similar in construction and mounting to the bearings 57, 57 already described and repetition of the detailed description is unnecessary. A hand wheel 78 is mounted on a forward extension of the nut 74 within convenient reach of the operator. The hand wheel 78 may be graduated similarly to the hand wheel 56 and an arm 79 is provided on the slide 76 having an indicator thereon adjacent the graduations on the hand wheel.

Means is provided for frictionally resisting the rotation of the nut 74, this being a friction washer 80 similar to the friction washer 67 shown in Fig. 2. By means of the friction washer 80 and by means of the bearings 77, 77, which can be loaded as already described, resistance is offered to the rotation of the nut. The said resistance is sufficient to normally prevent rotation of the nut 74 with the screw 68 by power transmitted from the motor, but it is not so great as to interfere with rotation of the nut by means of the hand wheel 78.

Upon power feeding in the rearward direction, if the feeding is not otherwise stopped, the front end of the screw 68 will engage a stop screw 81 threaded into the forward extension on the nut 74 and the nut will then turn in the bearings 77, 77, thus stopping the feeding and preventing any damage to the machine. Upon power feeding in the forward direction, if the feeding is not otherwise stopped, the cross slide 76 will reach its rearward limit of movement and thereupon frictional engagement between the screw 68 and the nut 74 will be increased to such an extent that the nut will turn with the screw in the bearings 77, 77, thus permitting continued rotation of the screw without damage to the machine.

While the construction shown in Fig. 3 is similar in principle to that shown in Fig. 2, it nevertheless offers certain important advantages. The hand wheel 76 can be positioned very close to the cross slide with assurance that it will never encroach upon any space provided for the cross slide, because the two travel together. This makes it possible to use a much shorter extension on the nut and also makes it unnecessary to provide a long pointer arm for the hand wheel such as the arm 58 shown in Fig. 1. In lieu thereof there is provided the much shorter arm 81 which is carried directly by the cross slide.

It has been explained that outward movement of the cross slide is limited by engagement of the screw 59 or 81 by the end of the feed screw 53 or 68, or alternatively by engagement of the hub of the gear 52 with the inner end of the bushing 62. Inward movement of the slide is limited by engagement with an adjustable stop screw located in the lower part of the upright post of the machine, but not herein shown. When this occurs the bushing 62 again turns idly with the feed screw and the hand wheel.

Having thus disclosed my invention and described in detail a specific embodiment thereof for purposes of illustration, I claim as new and desire to secure by Letters Patent:

1. In a feed mechanism, the combination of a main frame, a slide movable on the frame and serving to effect relative cross movements between a cutting tool and a work piece, a rotatable screw and a rotatable nut engaging the screw, one of the last said elements being rotatably connected with the slide and axially movable in unison therewith and the other of the said elements being rotatably connected with the frame and held against axial movement whereby rotation of either element relative to the other causes movement of the slide, means for rotating the screw intermittently relatively to the nut to effect cross feeding movements of the slide, manually operable means for rotating the nut relatively to the screw to effect cross movements of the slide supplemental to those effected by rotation of the screw, frictional means for resisting the rotation of the nut under frictional drag of the screw, and means for establishing a positive rotary connection between the nut and screw.

2. In a feed mechanism, the combination of a main frame, a slide movable on the frame and serving to effect relative cross movements between a cutting tool and a work piece, a rotatable screw and a rotatable nut engaging the screw, one of the last said elements being rotatably connected with the slide and axially movable in unison therewith and the other of the said elements being rotatably connected with the frame and held against axial movement whereby rotation of either element relative to the other causes movement of the slide, two oppositely disposed anti-friction bearings for supporting the nut, the nut being otherwise freely rotatable, means for rotating the screw intermittently to effect cross feeding movements of the slide, manually operable means for rotating the nut to effect cross movements of the slide supplemental to those effected by rotation of the screw, means for applying endwise pressure to the anti-friction bearings so as to load the bearings and thereby resist rotation of the nut under frictional drag of the screw, and means for establishing a positive rotary connection between the nut and screw at either limit of cross feeding.

3. In a feed mechanism, the combination of a main frame, a slide movable on the frame and serving to effect relative cross movements between a cutting tool and a work piece, a rotatable screw and a rotatable nut engaging the screw, one of the last said elements being rotatably connected with the slide and axially movable in unison therewith and the other of the said elements being rotatably connected with the frame and held against axial movement whereby rotation of either element relative to the other causes movement of the slide, power operated mechanism rotating the screw intermittently relatively to the nut to effect cross feeding movements of the slide, manually operable means for rotating the nut relatively to the screw to effect cross movements of the slide supplemental to those effected by rotation of the screw, frictional means for resisting rotation of the nut normally to prevent it from rotating automatically with the screw without interfering with manual rotation of the said nut, and means including a stop at one end of the nut for causing the nut to rotate with the screw when the slide reaches its limit of movement in either direction.

4. The combination in a feed mechanism, of a main frame, a slide movable on the frame and serving to effect relative cross movements between a cutting tool and a work piece, a rotatable screw connected with the slide and axially movable in unison therewith, a rotatable nut engaging the screw and held against axial movement with respect thereto, frictional means for supporting the nut from the frame leaving the nut otherwise free to turn, a gear connected with the screw and movable therewith, an elongated pinion meshing with the gear and of sufficient length to remain in mesh therewith throughout the range of movement of the gear, power operated mechanism rotating the pinion intermittently to thereby rotate the screw intermittently relatively to the nut and thereby effect cross feeding movements of the slide, and manually operable means for rotating the nut relatively to the screw to effect cross movements of the slide supplemental to those effected by rotation of the screw.

5. The combination in a feed mechanism, of a main frame, a slide movable on the frame and serving to effect relative cross movements between a cutting tool and a work piece, a rotatable screw connected with the slide and axially movable in unison therewith, a rotatable nut engaging the screw and held against axial movement with respect thereto, frictional means for supporting the nut from the frame leaving the nut otherwise free to turn, power operated mechanism for rotating the screw intermittently relatively to the nut to effect cross feeding movements of the slide, manually operable means for rotating the nut relatively to the screw to effect cross movements of the slide supplemental to those effected by rotation of the screw, and means for resisting rotation of the nut normally to prevent it from rotating automatically with the screw without interfering with manual rotation of the said nut.

6. The combination in a feed mechanism, of a main frame, a slide movable on the frame and serving to effect relative cross movements between a cutting tool and a work piece, a rotatable screw connected with the slide and axially movable in unison therewith, a rotatable nut engaging the screw and held against endwise movement with respect to the main frame, power operated mechanism for rotating the screw intermittently relatively to the nut to effect cross feeding movements of the slide, manually operable means for rotating the nut relatively to the screw to effect cross movements of the slide supplemental to those effected by rotation of the screw, means for resisting rotation of the nut normally to prevent it from rotating automatically with the screw without interfering with manual rotation of the said nut, frictional means for supporting the nut from the frame while leaving it free to rotate with the screw when the slide reaches its limit of movement in either direction, and a stop in one end of the nut for determining one of said limits.

7. A feed mechanism comprising in combination, a main frame, a slide movable on the frame and serving to effect relative cross movements between a cutting tool and a work piece, a rotatable screw connected with the frame and held against axial movement, a rotatable nut engaging the screw and rotatably connected with the slide and axially movable in unison therewith, power operated mechanism for rotating the screw intermittently relatively to the nut to effect cross feeding movements of the slide, manually operable means for rotating the nut relatively to the screw to effect cross movements of the slide supplemental to those effected by rotation of the screw, frictional means for resisting rotation of the nut normally to prevent it from rotating automatically with the screw without interfering with manual rotation of the said nut, and means for establishing a rotary connection between the nut and screw at one limit of cross feeding.

8. A feed mechanism comprising in combination, a main frame, a slide movable on the frame and serving to effect relative cross movements between a cutting tool and a work piece, a rotatable screw connected with the frame and held against axial movement, a rotatable nut engaging the screw and rotatably connected with the slide and axially movable in unison therewith, power operated mechanism for rotating the screw intermittently relatively to the nut to effect cross feeding movements of the slide, manually operable means for rotating the nut relatively to the screw to effect cross movements of the slide supplemental to those effected by rotation of the screw, means for resisting rotation of the nut to normally prevent it from rotating automatically with the screw without interfering with manual rotation of the said nut, and means including a stop in the end of the nut for causing the nut to rotate with the screw when the slide reaches its limit of movement in either direction.

9. A feed mechanism comprising in combination, a main frame, a slide movable on the frame and serving to effect relative cross movements between a cutting tool and a work piece, a rotatable screw connected with the main frame and held against axial movement, a rotatable nut engaging the screw and axially movable in unison with the slide, means for frictionally supporting the nut from the slide while leaving it otherwise free to turn with the screw, power operated mechanism for rotating the screw intermittently relatively to the nut to effect cross feeding movements of the slide, a graduated hand wheel carried by and bodily movable with the nut and the slide for rotating the said nut relatively to the screw to effect cross movements of the slide supplemental to those effected by rotation of the screw, a stop in the end of the nut for engaging the end of the screw, and a pointer arm carried by and movable with the slide for indicating the extent of rotation of the hand wheel.

STEPHEN E. WOODBURY.

REFERENCES CITED

The following references are of record in the file of this patent:

UNITED STATES PATENTS

| Number | Name | Date |
| --- | --- | --- |
| 1,846,956 | Einstein et al. | Feb. 23, 1932 |
| 2,118,369 | Vancil | May 24, 1938 |